US008144871B2

(12) United States Patent
Dupray et al.

(10) Patent No.: US 8,144,871 B2
(45) Date of Patent: Mar. 27, 2012

(54) TRUSTED COMMUNICATIONS BETWEEN UNTRUSTING PARTIES

(75) Inventors: Dennis J. Dupray, Golden, CO (US); Sheldon F. Goldberg, Henderson, NV (US)

(73) Assignee: Dennis Dupray, Golden, CO (US)

( * ) Notice: Subject to any disclaimer, the term of this patent is extended or adjusted under 35 U.S.C. 154(b) by 1056 days.

(21) Appl. No.: 11/940,971

(22) Filed: Nov. 15, 2007

(65) Prior Publication Data

US 2008/0091937 A1    Apr. 17, 2008

Related U.S. Application Data

(63) Continuation of application No. 11/147,501, filed on Jun. 6, 2005, now abandoned, which is a continuation of application No. 09/617,386, filed on Jul. 17, 2000, now abandoned.

(60) Provisional application No. 60/144,350, filed on Jul. 16, 1999.

(51) Int. Cl.
     *H04K 1/00*      (2006.01)
(52) U.S. Cl. ............ 380/251; 713/150; 463/16; 463/17; 463/18; 463/19; 463/20; 463/25; 463/26; 463/27; 463/28; 463/29
(58) Field of Classification Search .................. None
See application file for complete search history.

(56) References Cited

U.S. PATENT DOCUMENTS

| 5,509,071 | A | * | 4/1996 | Petrie et al. ............... 705/53 |
| 5,629,982 | A | * | 5/1997 | Micali ............... 380/30 |
| 5,664,017 | A | * | 9/1997 | Gressel et al. .......... 380/30 |
| 5,671,280 | A | * | 9/1997 | Rosen ............... 705/67 |
| 5,708,709 | A | * | 1/1998 | Rose ............... 705/59 |
| 5,762,552 | A | * | 6/1998 | Vuong et al. .......... 463/25 |
| 5,836,816 | A | * | 11/1998 | Bruin et al. .......... 463/16 |
| 5,903,880 | A | * | 5/1999 | Biffar ............... 705/39 |
| 6,104,815 | A |  | 8/2000 | Alcorn et al. |
| 6,152,824 | A |  | 11/2000 | Rothschild et al. |
| 6,165,072 | A |  | 12/2000 | Davis et al. |

(Continued)

FOREIGN PATENT DOCUMENTS

WO    WO 98/30297    7/1998

(Continued)

OTHER PUBLICATIONS

Official Action for U.S. Appl. No. 09/617,386, mailed Jan. 12, 2005.

(Continued)

*Primary Examiner* — Edan Orgad
*Assistant Examiner* — Canh Le
(74) *Attorney, Agent, or Firm* — Sheridan Ross P.C.

(57) ABSTRACT

A system and method is disclosed for assuring that networked communications between parties playing a game on a network (e.g., the Internet) are not tampered with by either of the parties for illicitly gaining an advantage over the other party. An initial sequence of tokens (e.g., card representations) for playing the game are doubly encrypted using an encryption key from each of the parties. Accordingly, during play of the game neither party can modify the initial sequence of game tokens during the game. At termination of the game, at least one of the parties can fully decrypt the initial sequence of tokens, and thereby, if desired, compare the played token sequence with the corresponding the initial token sequence.

14 Claims, 2 Drawing Sheets

U.S. PATENT DOCUMENTS

| | | | |
|---|---|---|---|
| 6,188,766 B1 * | 2/2001 | Kocher | 380/246 |
| 6,203,427 B1 | 3/2001 | Walker et al. | |
| 6,790,139 B2 | 9/2004 | Walker et al. | |

FOREIGN PATENT DOCUMENTS

| | | |
|---|---|---|
| WO | WO 99/01188 | 1/1999 |
| WO | WO 01/06691 | 1/2001 |
| WO | WO 01/63528 | 8/2001 |

OTHER PUBLICATIONS

Official Action for U.S. Appl. No. 09/617,386, mailed Jan. 14, 2004.
Official Action for U.S. Appl. No. 11/147,501, mailed May 15, 2007.
"Cryptography," website, Mar. 1998, 11 pages.
"Legalized Internet Gaming Chances Improve," Casino-On-Net website, Aug. 23, 2000, 4 pages.

* cited by examiner

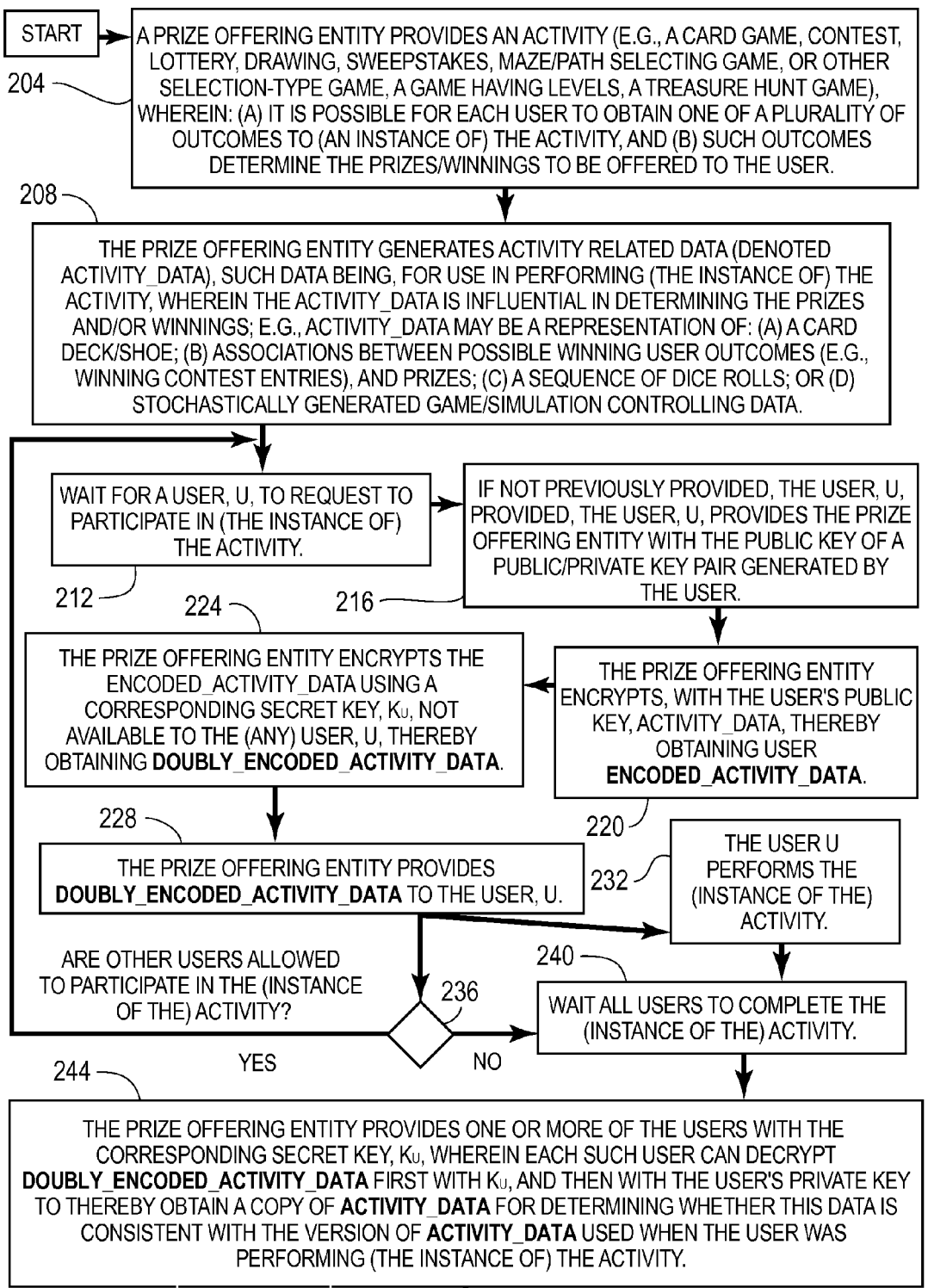

TRUSTED COMMUNICATIONS BETWEEN UNTRUSTING PARTIES

The present application is a continuation of U.S. patent application Ser. No. 11/147,501 filed Jun. 6, 2005 which is a continuation of U.S. patent application Ser. No. 09/617,386, filed Jul. 17, 2000 which claims the benefit of U.S. Provisional Patent Application No. 60/144,350, filed Jul. 16, 1999, the entire disclosure of each of these applications is herein incorporated by reference.

RELATED FIELD OF THE INVENTION

The present invention is related to assuring each of a plurality of parties, e.g., communicating on a network that none of parties can illicitly manipulate the information being communicated; however, after a predetermined event, e.g., the termination of a game, the information can be viewed and verified by all parties.

BACKGROUND OF THE INVENTION

Electronic communications and interactions such as on networks like the Internet have greatly expanded the potential for interactions among people, organizations and businesses. However, although such communications offer substantial advantages in terms of the speed and ease of communications, these advantages are often offset by the disembodied nature of the communications. In particular, electronic network communications between parties wherein at least one of the parties is believed to be potentially untrustworthy, or there is a question about one of the parties' authenticity can greatly affect the acceptance of electronic communications as a substitute for face-to-face communication. Accordingly, when communicating particularly sensitive information between two parties, it would be preferable that each party be able to verify that the sensitive information is treated as intended. For example, when games are played on the Internet wherein such games offer prizes and/or returns on bets, and where the games are largely dependent upon a predetermined order or arrangement of tokens (e.g., card representations) or game scenarios, network game players may find it difficult to fully trust the game sponsor/provider to not distort the chances of game players to receive all prizes and/or be fairly compensated for wagers made. Alternatively, such game sponsors/providers are unwilling to provide to game players the game outcomes prior to the completion of such a game in that the game players could potentially use such outcomes prior to the completion of the game for their own benefit. Thus, it would be desirable to have a communications network capability that guarantees that both network game players, and sponsors/providers of games (such as contests, sweepstakes, and casino games), each to be able to verify that the other party is playing the game fairly.

Alternatively, when providing an auction for electronic sealed bids, similar concerns regarding trustworthiness of auction parties may undesirably affect the bidding process. For instance, when a plurality of companies are competing with one another for a contract, there may be a concern that a sealed bid from one company might be inappropriately communicated to another of the bidding companies. Thus, it would be desirable for such companies to be assured that their sealed bids could not be misappropriated by competing companies.

SUMMARY OF THE INVENTION

In one aspect, the present invention is a novel method and system for assuring that no party involved in the play of a game is able to a inappropriately tamper with or inappropriately disclose pre-game arrangement of tokens and/or events for the game. More generally, the present invention reduces the likelihood that any of the parties involved in a game or contest (e.g., parties such as the sponsor/provider of a game or contest, or any player of the game or contest) is likely to play unfairly by unscrupulously manipulating or disclosing the arrangement of tokens and/or events of the game or contest. The present invention is particularly useful in assuring such parties when game or contest communications between parties occur via transmissions on a communications network such as a local are network, a wide area network, the World Wide Web, the Internet, or some combination of the above.

In one embodiment of the present invention, at least one trusted third party is utilized for assuring that both players and game sponsors perceive the game as being played fairly. For example, when playing a card game on the Internet (or other communications network), wherein wagers are placed on a game outcome, such a trusted third party might be a website to which a representation of card deck(s) for playing the game is transmitted by the sponsor/provider prior to commencement of the game, and wherein, e.g., the copy of the card deck(s) at the trusted third party is available to the game players upon completion of the game for checking against the cards actually played in the game. Accordingly, the game sponsor/provider may provide to each game player, prior to a game commencement, an identification tag for identifying the deck(s) with which the player is playing so that upon termination of the game the player can present (e.g., transmit via the network) the tag to the trusted third party for thereby receiving a copy of the deck(s) representation. That is, once the game is completed and the sponsor/provider has notified the trusted third party that the game is completed, each player would be able to receive a copy of the deck(s) from the third party by providing the identification tag.

Alternatively, such a card deck(s) representation may be generated by the trusted third party and subsequently provided to the game sponsor/provider along with an identification tag for identifying the deck(s) so that the sponsor/provider can, in turn, provide the identification tag to game players using the deck(s) when playing a game. Subsequently, upon game termination, each player may request from the trusted third party, a copy of the deck(s) representation used in playing the game. In another embodiment, each player may transmit a game log to the trusted third party, wherein the third party performs a comparison between the card representations played and the corresponding card representations in the copy of the deck(s) representation retained by the third party. Moreover, note that similar verification techniques may be used with other games or contests for assuring that pre-game or pre-contest data is not inappropriately changed during the game or contest.

In another embodiment of the present invention, a trusted third party is unnecessary. Instead, the game sponsor/provider and the players transmit various encryption keys and encodings of the pre-game arrangements of game tokens and/or game events between one another according to a method of the present invention that substantially assures that the pre-game arrangement is neither tampered with during the game, nor known to a game player prior to an appropriate disclosure time during or after the game. In particular, this embodiment of the present invention, when applied to a communications network version of a card game (such as on the Internet), provides for the date representation of the card deck(s) to be encrypted using a first encryption key provided by a game player, and then encrypted using a second encryption technique provided by the game sponsor/provider. More precisely, for each player, the present invention allows the representation of the card deck(s) for the game (or instance thereof) to be doubly encrypted prior to commencement of the game, and the doubly encrypted version of the deck(s) is provided to the player of the game prior to game commencement. Thus, upon termination of the game, each player may utilize a decryption key provided at game termination by the game sponsor/provider to decrypt the second encryption of the card deck(s), and subsequently use the player's personal decryption key to decrypt the first encryption of the card deck(s). Accordingly, each game player may receive a substantially distinct doubly encrypted version of the card deck(s) prior to commencement of a game instance, but the game player is unable to determine the cards within the deck(s) other than by playing the game since the encrypted version of the deck(s) provided to the player is encrypted with at least one encryption technique wherein the decryption key is not provided to player until the game instance is completed.

In a general context, it is an aspect of the present invention that for an activity (such as a game or contest), wherein a predetermined arrangement of tokens and/or events (e.g. a card deck) is pivotal to the success of a user in performing (an instance of) the activity, the present invention also provides both the users (e.g., participants) and the activity sponsor/provider with the assurance that the predetermined arrangement is unlikely to be manipulated or disclosed so that one party has an unanticipated advantage or disadvantage. Thus, the likelihood that a user is at an unanticipated disadvantage is reduced. In one embodiment of the present invention, the predetermined arrangement is doubly encrypted substantially as described above, and the results are provided to each user. Thus, the predetermined arrangement is first encoded by the sponsor/provider, via a first encryption technique, using a user supplied public key, and subsequently, the result is encoded so that a secret key, not known by the user, is to be used in decoding the latter encoding. Moreover, note that the order of applying the first and second encryption techniques may be reversed in some embodiments. Additionally, to further assure that the predetermined arrangement does not place a user at an unanticipated disadvantage, the present invention allows a user to select tokens or events in an order different from the predetermined arrangement. For example, when the activity is a game, such game tokens (e.g., cards) or game events may be selected by a user indicating the position of a desired game token relative to other tokens or game event representations in the predetermined arrangement. For instance, if the game uses a deck of cards, a user may choose to play only every other card, or more generally, every $n^{th}$ card ($n \geq 2$). Alternatively, other characteristics of such tokens or events substantially unrelated to their game utilization may be used for selection; e.g., a color, size, or shape of such a token and/or event representation may be used.

Note that for parties utilizing a network for communications, the doubly encoded aspect of the present invention together with the ability of users to select from among a predetermined arrangement of tokens or events according to a user desired selection criteria, is analogous to the technique for assuring fairness in a face-to-face card game wherein one participant of the game shuffles and another participant cuts the card deck.

Accordingly, the present invention can be utilized for substantially assuring the integrity of parties' actions during network communications for:

(a) Games utilizing dice (e.g. board games, craps, etc.), or cards, (e.g., poker, blackjack, hearts, etc.);

(b) Games wherein objects must be located and/or a particular path must be identified and traversed (e.g., electronic treasure hunt games where there is a predetermined one or more winning game configurations within a simulated or virtual environment);

(c) Network lotteries or drawings, wherein the winning game configurations are predetermined prior to commencement of the game;

(d) Selection games such as games where a game player selects one or more game tokens and/or game events, and wherein for at least some of the potential game selections, there is a predetermined prize associated therewith. For example, Internet games wherein a graphic is displayed to a game player and the player is able to select a location on the graphic for determining if the location selected (e.g., a pixel) has a prize associated therewith; and (e) Electronic versions of sweepstakes contests wherein contestants are provided with a contestant identification such that if the identification has been selected as a winning identification, the contestant wins a particular prize;

(f) Testing services wherein testing is performed via a communications network;

(g) Auctions via a communications network, wherein, e.g., bidders may be wary of the security of their bids in a sealed bid auction.

Other benefits and features of the present invention will become evident from the detailed description and accompanying drawings herein.

BRIEF DESCRIPTION OF THE DRAWINGS

FIG. 2 is a flowchart of a second embodiment of the present invention for assuring trusted network communications among potentially interesting parties involved in an activity such as same or contest.

DETAILED DESCRIPTION OF THE PREFERRED EMBODIMENT

Figure 1:
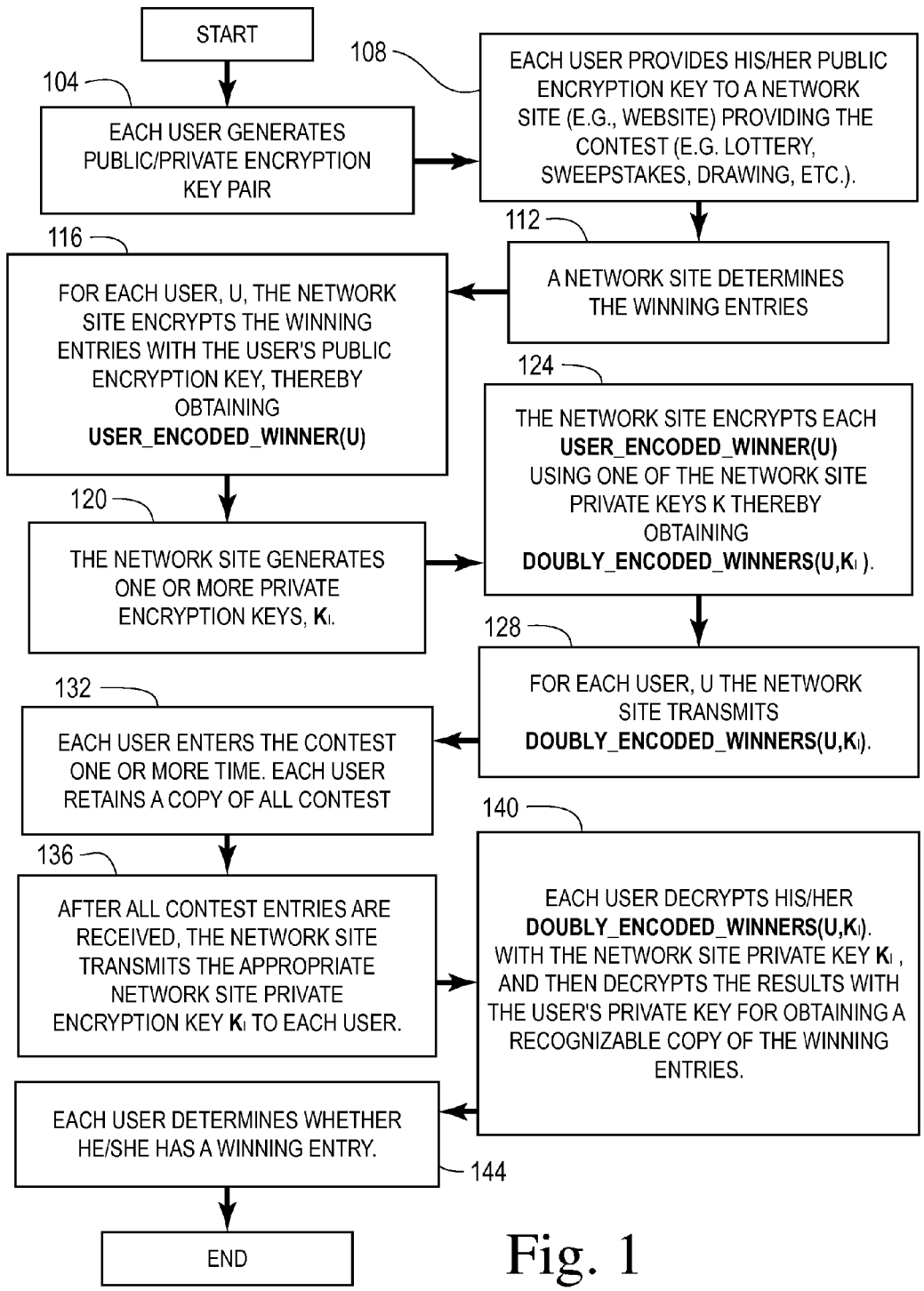
FIG. 1 is a flowchart of a first embodiment of the present invention for assuring trusted communications regarding a contest provided on a communications network.

FIG. 1 illustrates a first embodiment of the present invention wherein the users of a communications network are able to enter contests (e.g., lotteries, sweepstakes, drawings, etc.) on the network and be assured that a predetermined winning entry to the contest cannot be manipulated during the contest. Thus, the present invention provides greater trust by contestants in the contest sponsor/provider since there is assurance that one or more winning entries have already been selected and that anyone who selects such a winning entry will indeed win the contest.

Moreover, note that the network for the contest can be the Internet, the World Wide Web, a wide area network, or a local area network such as may be provided in a casino, hotel, cruise ship or aircraft. Accordingly, the flowchart of FIG. 1 may be described as follows. In step 104, each user (e.g., contestant) generates a public/private encryption key pair such as is well known in the encryption arts. For example, various versions of the procedure known as RSA can be used to generate the public/private encryption key pair. One such commercially available software product enabling RSA is the product PGP (also known as "Pretty Good Privacy") that is widely available.

Subsequently, in step 108, each user provides his/her public encryption key (generated in step 104) to a network site (e.g., an Internet website) that is providing the contest. For example, such public encryption keys may be provided with a user's identification (e.g., password) for registering at the network site. Subsequently, in step 112, the network site determines the one or more winning contest entries. Note that the winning entries may be determined at any time prior to the commencement of allowing users to enter the contest. For example, in providing an Internet lottery system, one or more winning sets of lottery numbers can be determined prior to allowing users to select lottery number combinations, and according to the present invention, such users can be assured that the winning lottery combinations have not been tampered with between their selection and the completion of the lottery.

Subsequently, as each user, U, enters the contest (step 116), the predetermined winning entries are encrypted with the user's public encryption key obtaining a result denoted herein as "USER_ENCODED_WINNERS(U)". Thus, as one skilled in the art will understand, the contest sponsor/provider thereafter is substantially unable to tamper with such encoded winning entries. As an aside, it is worth noting that users may enter such a contest in other ways besides transmitting network (e.g., Internet) contest entry requests. In particular, such requests may also be provided via e-mail, a voice telephone call, or conventional mail.

In step 120, the network site subsequently generates one or more private encryption keys $K_i$. Note that such keys need not be generated specifically according to the sequence of steps provided in FIG. 1. In particular, such private encryption keys $K_i$ may be generated by the network site at substantially any time prior to step 124 described hereinbelow. Accordingly, in step 124, the network site encrypts each USER_ENCODED_WINNERS(U) using one of the network site private keys $K_j$, thereby obtaining a result denoted herein as "DOUBLY_ENCODED_WINNERS(U, $K_i$)". Note that such private (e.g., equivalently, secret) keys $K_i$ may be used with various types of encryption procedures such as DES (U.S. government standard specified in FIPS PUB 46). However, other private/secret encryption techniques are also within the scope of the present invention, such as IDEA™, Blowfish™, RC4™, RC2™, SAFER™, and various hashing techniques, as one skilled in the art will understand. Further, public/private key encryption techniques may also be used here if desired.

In step 128, each user U is provided with a corresponding doubly encoded version of the predetermined winning contest entries, DOUBLY_ENCODED_WINNERS(U, $K_i$). Accordingly, although each user U has a private key that is able to decode a message encoded with the user's public key, the user is unable to decode the transmission of the contest winners without the corresponding private/secret encryption key $K_i$. Further, note that although many encryption schemes can be broken if there is sufficient time and computational capacity, note that by providing sufficiently long keys $K_i$ (e.g., 128 bit keys or longer), such illicit decrypting by a user is reduced. Further, since the identification of the one or more winning entries can be substantially a string of (e.g., ASCII) characters, with possibly additional substantially random or "noise" character codes (more generally, data irrelevant to the identification of the winning entries) interspersed therein for further security, it is believed that such doubly encoded versions of winning contest entries are secure from illicit decrypting. In particular, with the interspersing of noise character codes and assuming the winning entry data is sufficiently long (e.g., 12 to 20 characters or longer), the length of the string to subsequently doubly encrypt (this string denoted herein "noisy winning entry data") can be substantially longer than the actual winning entry data. Moreover, a formula for identifying the actual winning entry data within the noisy winning entry data can be provided (after contest termination) to the user. For instance, such formulas may be as simple as starting with the $j^{th}$ character of the noisy winning entry data, select every other (alternatively, every $n^{th}$ where $n \geq 2$) character to derive the winning entry data.

Once a user U has received his/her corresponding DOUBLY_ENCODED_WINNERS(U, $K_i$), the user may enter the contest one or more times (step 132), wherein the user retains either electronically or otherwise the identification of each of his/her contest entries. Subsequently, in step 136, after all contest entries are received, the network site transmits the appropriate network site private encryption key $K_i$ to each user, optionally, together with a user readable version of the winning entries. Accordingly, in step 140, each user is able to decrypt his/her doubly encoded version of the predetermined winning contest entries using first the private key $K_i$ transmitted by the network site together with, e.g., a standard decryption program provided by, for instance, a commercially available decryption package or by decryption software obtained (e.g., downloaded) from a trusted third party network site (e.g., website). Subsequently, the user is then able to decrypt the results from the above decryption process by using his/her private encryption key. Thus, a recognizable copy of the winning entries then becomes available to each user. Note, however, that if within the data for the winning entries there was initially interleaved other noise characters (thereby obtaining noisy winning entry data), then a subsequent communication from the network site indicating, e.g., which characters to use in determining the predetermined winning entries may also be provided to each user. For example, such additional transmissions may provide a simple formula for ultimately determining the characters of the winning entries from the doubly decrypted data. Subsequently, in step 144, each user is able to determine whether he/she has a winning entry by comparing his/her contest entry identifications with the winning identifications obtained from step 140.

It is important to note that if the noise characters are interspersed differently for each of a sufficiently large number of contest users, then the contest sponsor/provider will be unable to change the predetermined winning entries during or after the contest by simply changing the formulas prior to providing the formulas to the users.

Moreover, if the sponsor/provider publicizes the winning entries after the contest is terminated, and, for example, users are able to communicate with other users (e.g., via a bulletin board or network chat room) and/or users are able to view a sufficiently large plurality of different instances of noisy winning entry data that were actually provided to other users during the contest, then it is believed that users will be assured that no alternative set of one or more winning entries could have been substituted by the sponsor/provider changing formulas during the contest. Further, note that it is within the scope of the present invention that the step of providing the noisy winning entry data can be accomplished in various ways, such as positioning characters of the winning entries according to: (a) at offsets from prime number positions in a resulting noisy winning entry data instance, or (b) a geometric progression wherein the number of noise characters between consecutive characters identifying the winning entries grows geometrically (e.g., 2 noise characters, then 4 noise characters, then 8 noise characters, etc.). It is, however, in at least one embodiment, preferable that each contest user be able to easily determine the winning entry data from noise characters without relying upon any computational module provided by the sponsor/provider, and more preferably, each user should be able to determine the winning entry data without any computational assistance whatsoever (i.e., entirely manually).

Note that it is also within the scope of the present invention that the contest sponsor/provider need not communicate with users entirely via network communications from a network site as described hereinabove. In particular, contest communications may be also performed by traditional mailings. Moreover, it is also within the scope of the present invention that contest processing need not necessarily be performed at the network site as indicated in some steps of the flowchart of FIG. 1. In particular, the network site may merely provide a network portal to various contests wherein the contest processing is performed remotely from the network site and transmitted therethrough to the contest users. Additionally, note that it is within the scope of the present invention that the phrase "each user" in the steps of FIG. 1 may be replaced with phrases such as "some one or more users". For instance, it is within the scope of the present invention that the steps provided in FIG. 1 may be asynchronously performed for each user such that for different users, the different users and/or the network site may be substantially simultaneously performing different steps of the flowchart of FIG. 1. For example, a first user may be generating his/her public/private encryption key pair (e.g., step 104), while a second user may be substantially simultaneously in the process of providing a contest entry (e.g., step 132). However, in at least one embodiment of the present invention, the predetermining of winning entries (e.g., step 112) should occur prior to the receipt of user contest entries (e.g., step 132) for at least a sufficient number of users so that substantially all users trust that the predetermined contest winning entries were not illicitly modified after users were allowed to enter the contest.

The flowchart of FIG. 2 illustrates another embodiment of the present invention for providing trusted communications between parties, wherein at least one of the parties may be inclined to distrust communications provided by the other party. For instance, the flowchart of FIG. 2 illustrates an embodiment of the present invention for use in providing trusted network communications in activities such as various kinds of games and contests. In particular, the flowchart of FIG. 2 describes steps to be performed related to communications between two parties wherein a first of the parties provides an activity that can be performed by a second party, and further, the first party selectively provides the second party with data related to the activity, as appropriate, while the second party is performing the activity and/or after the second party has completed the activity. Note that such activities may be:

(a) various interactive games such as card games (e.g., hearts, poker, blackjack);

(b) contests (e.g., lotteries, sweepstakes, drawings, or other games wherein users, such as players or participants, select or receive contest entries);

(c) activities wherein prizes are distributed throughout a simulated or virtual environment and wherein a user encounters the prizes by a combination of skill and/or fortitudinous selection (e.g., a simulated graphical maze-type video game such as dungeons and dragons, a game wherein a user attempts to select a "winning" simulated graphical door, selection of a "winning" pixel of a displayed graphic, various combat games wherein users encounter prizes on different levels of the game, and treasure hunt-type games wherein a user searches through a simulated environment for prizes encountered therein).

Accordingly, in all such activities, there is data related to the activity which should not be manipulated by a sponsor/provider of the activity to the detriment of a user, and correspondingly such data should not be misused by the user to the detriment of the activity sponsor/provider and/or other users. For example, if one such activity is a networked representation of a card game, such as poker or blackjack, a sponsor/provider (or dealer) for the networked game may determine (as such activity related data) a card ordering for one or more card deck representations to be used in playing the game. Moreover, it is typically assumed that the card representations in the card deck representations should not be reordered or inappropriately manipulated during the game, and that game users (e.g., players) should only be able to view the faces of card representations as is appropriate to the rules of the game. As a further example, consider an interactive network advertisement (e.g., on the Internet), wherein the advertisement consists of a virtual world having embedded therein advertising information related to at least one of a product and a service as well as prizes, bonuses, and/or discounts related to the products and/or services being advertised. For instance, such a virtual world may allow a user to navigate through this world and accumulate various prizes according to the area of the world explored, and optionally, also according to the user's expertise in playing a game provided in the virtual world, or the user's knowledge regarding some area of knowledge possibly related to the products or services being advertised. For example, such a virtual world might include past, current and future cars from a particular automaker wherein users are allowed to assemble, disassemble, redesign, drive and/or crash these cars, and wherein prizes such as discounts for buying a car currently being manufactured by the automaker are distributed throughout the virtual world). Thus, in such a virtual world, it would be desirable that users be assured that the prizes promoted as being contained therein are indeed eligible for the users to acquire. Thus, one way to provide the user with such assurances is provided in the flowchart of FIG. 2.

Moreover, note that the present invention may be used in interactive advertising such as is presented to Internet users. For instance, when such users are viewing and/or interacting with an Internet presentation (e.g., a search engine, an online personal finance system, or an online shopping system), advertisements may offer prizes (or other compensation) for interacting with their advertisements, wherein the user has a chance of winning a prize by entering a contest or playing a game such as attempting to select a winning pixel, or other graphical area. Accordingly, the present invention can be used to assure the user that the prize winning area has already been determined.

The steps of FIG. 2 are described as follows: in step 204, a prize offering entity (e.g., an Internet website, or a casino having a gaming local area network) provides an activity wherein:

(a) It is possible for each user performing the activity (or an instance thereof) to obtain one of a plurality of outcomes, and (b) Such outcomes determine the prizes and/or winnings offered to users performing the activity.

In step 208, the prize offering entity generates data related to (an instance of) the activity being offered, wherein for convenience, this data is denoted ACTIVITY_DATA. Note that ACTIVITY_DATA is dependent upon the type of activity provided by the prize offering entity. Thus, if the activity offered is a card game, then ACTIVITY_DATA may be a representation of a card deck or card shoe. Alternatively, if the activity is a contest, lottery or other similar endeavors, then ACTIVITY_DATA may be a predetermined association between:

(i) Possible winning user outcomes (e.g., winning entries wherein the activity is a contest), and (ii) Prizes to be awarded to the user(s) having the winning outcomes.

Additionally, such ACTIVITY_DATA may be a predetermined sequence of dice rolls (e.g., a predetermined sequence of numbers between 2 and 12) for activities such as games where the dice values determine the position of a user's token (e.g., Monopoly-type games), or other games such as craps or other wagering games dependent upon dice rolls. Further, such ACTIVITY_DATA may be related to activities such as games or simulations having predetermined stochastically generated controlling data and/or having probabilities regarding the encountering of prizes. For example, games such as network-based (e.g., Internet) slot machine simulations whereby an advertised percentage of funds are received from the playing of such slot machines is returned as winnings. Thus, ACTIVITY_DATA may include the slot machine results for, e.g., the next 500 plays. Thus, after a user indicates to the prize offering entity his/her desire to stop playing, the user would then be allowed to decrypt an encrypted version of ACTIVITY_DATA to determine, e.g., what slot machine plays would have occurred if the user had continued, so that, e.g., the user may determine how close to the advertised percent of returned funds compares with the 500 results he/she could have played. Thus, the present invention may offer further enticements to users in that a user can see what would have happened if he/she had continued playing (or more generally, performing the activity).

As an aside, note that is an aspect of the present invention that although such ACTIVITY_DATA may be transmitted through a communications network, at least some of the software and/or data for the activity may be provided on a storage media such as a compact disk, or a DVD. Accordingly, it is within the scope of the present invention that the software and/or hardware for enabling embodiments of the present invention may be provided from a plurality of different sources. However, in each embodiment of the flowchart of FIG. 2, ACTIVITY_DATA is influential in determining one or more of: an outcome for the activity, prizes and/or winnings that can be distributed to users performing the activity to which the ACTIVITY_DATA is related.

Returning to FIG. 2, in step 212, the prize offering entity waits for a user U to request to participate in the activity (or instance thereof). Subsequently, in step 216, if the user has not previously provided to the prize offering entity, the public key of a public/private key encryption pair specific to the user (and likely generated by the user), then the user provides such a public key to the prize offering entity in this step. Note that in one embodiment of the present flowchart, the user transmits his/her public key to the prize offering entity via the Internet. In step 220, the prize offering entity encrypts, with the user's public key, the ACTIVITY_DATA for the (instance of the) activity in which the user has requested to participate. Accordingly, the results of this encryption is denoted herein as ENCODED_ACTIVITY_DATA. Thus, it is worth noting that once ACTIVITY_DATA is encrypted into ENCODED_ACTIVITY_DATA, the prize offering entity is restricted from manipulating this activity related data for purposely changing this data in a predictable way that, e.g., provides the user with either a greater disadvantage or advantage than would otherwise be the case if there were no tampering with such data.

Subsequently, in step 224, the prize offering entity encrypts the ENCODED_ACTIVITY_DATA with a second encryption procedure using a corresponding secret key, $K_U$, not available to the user U (and likely not available to any user or participant in the activity). Note that $K_U$ may be different for each time the user participates in the activity. Thus, assuming the second encryption is dependent on K, each such second encryption will be different. Accordingly, the result is that ACTIVITY_DATA is now doubly encrypted and the results will be denoted herein as DOUBLY_ENCODED_ACTIVITY_DATA. In step 228, the prize offering entity provides DOUBLY_ENCODED_ACTIVITY_DATA to the user U. In particular, DOUBLY_ENCODED_ACTIVITY_DATA may be transmitted to the user U via the Internet. Thus, DOUBLY_ENCODED_ACTIVITY_DATA cannot be changed in a predictable way by either the prize offering entity or the user U. Further, as discussed with reference to the winning entries data of FIG. 1, if ACTIVITY_DATA is interleaved with random alphanumeric "noise" data in a simple predictable fashion (e.g., prior to encoding ACTIVITY_DATA with the user's public key, ACTIVITY_DATA is interleaved with meaningless "noise" data according to, e.g., a formula dependent upon a small number of parameters (e.g., $\leq 3$), such that users can manually or with a conventional calculator distinguish the data of ACTIVITY_DATA from the noise data once values for the parameters are provided). Thus, with the introduction of noise data, the data encrypted by the user's public key (step 220) can be substantially larger than ACTIVITY_DATA. Moreover, since a majority of the data encrypted with the user's public key may be noise or random data, it is believed that this further inhibits illicit access to ACTIVITY_DATA by the user.

Following step 228, the two steps 232 and 236 are performed substantially asynchronously, wherein step 232 is performed by the user and step 236 is performed by the prize offering entity substantially independent from step 232. In particular, in step 232, the user U performs the (instance of the) activity, and in step 236, a determination is made by the prize offering entity as to whether other users are allowed to participate in the (instance of the) activity. Accordingly, if other users are allowed to participate, then steps 212 through 236 are again performed until no further users are allowed to participate the (instance of the) activity. After step 232 and/or step 236, step 240 is encountered wherein each user participating in the activity and/or the prize offering entity waits for all users to complete the (instance of the) activity. In particular, step 240 may be interpreted to mean that no further steps for the present flowchart are available to be performed until all users have performed the (instance of the) activity, and the prize offering entity has determined that there are no further users eligible to participate in the (instance of the) activity. However, step 240 should not be given a narrow interpretation wherein users and/or the prize offering entity substantially ceases to perform other tasks than the steps of the present flowchart. For example, if the prize offering entity is a website that is providing a tournament for a particular game, wherein each user must complete a predetermined number of game instances, then one or more users and/or the prize offering entity may be required to wait (at step 240) for a plurality of days until all users have completed the predetermined number of games, or a tournament time limit has expired. However, this does not mean that the website ceases performing tasks substantially unrelated to the final step (244) of FIG. 2.

Once all users have completed the (instance of the) activity, then step 244 is performed, wherein the prize offering entity provides to at least one or more of the users U, a corresponding one of the secret keys $K_U$ so that each of these users can decrypt DOUBLY_ENCODED_ACTIVITY_DATA, first with $K_U$, and subsequently with the user's private key. Thus, the user is able to obtain a copy of ACTIVITY_DATA for determining whether this data is consistent with the version of this data used when the user was performing (the instance of) the activity. Additionally, note that if ACTIVITY_DATA is interleaved with noise data, then in addition to the secret key $K_U$, the prize offering entity provides these users with any additional information to select ACTIVITY_DATA from the interleaved noise data. Note that for users that are geographically dispersed from one another and from the prize offering entity such as occurs in Internet communications, it may be preferable for every user u to receive a corresponding secret key(s) $K_U$ so that every user can obtain a copy of ACTIVITY_DATA.

When using the method of FIG. 2 with activities such as the playing of a card game on a communications network, it is a further aspect of the present invention that users (i.e., players) may be additionally assured that a sequence of card representations are not sequence in a manner that results in an unexpected or unfair disadvantage for the user. In particular, each user may be allowed to select the next one or more card representations to be played from the initial card sequence provided by the prize winning entity. For instance, each user may be allowed to specify cards to be played by: (a) selecting a subsequence of the card representations such as every second card (more generally, every $n^{th}$ card), or (b) randomly select the next one or more card representations by inputting positional information indicating the position(s) of the next card(s) to be played, such as positional information being, e.g., numerical input or graphical pointer (mouse) input. Thus, the sequence of card representations is not predetermined by the prize offering entity, but the initial sequence of card representations is predetermined and verifiable by users.

Note that in another embodiment, the present invention may be used as a trustworthy system and method for performing a procedure similar to "drawing straws," wherein the users (e.g., straw drawers) utilize a communication network (e.g., the Internet) to draw the "straws," and wherein the users do not necessarily trust one another. In particular, the present invention allows the users in a group of users to select one or more of their group randomly (or some particular random option) without an intervening trusted third party.

In a simple version of the present embodiment, a designated user of the group generates a list of N distinct numbers ($N \geq 2$), wherein N is the number of users in the group. Subsequently, each member (other than the designated user) supplies the designated user with a public key of a public/private encryption key pair. For each user supplied public key, the designated user encrypts the list with the public key and then encrypts the result with a secret key known only to the designated user. The designated user then transmits the doubly encoded list to the user that supplied the public key. Accordingly, once the designated user has supplied a doubly encrypted version of the list to each of the other users of the group, each user other than the designated user selects a distinct number from the list by, e.g., requesting the number in a particular position in the list such as the number in the fifth position. Accordingly, the designated user by default is provided with the single remaining number after all other users of the group have selected a number from the list. Then, the designated user supplies each of the other users with the designated user's secret key so that each of the other users can decrypt their doubly encrypted version of the list, first with the designated user's secret key, and then with their corresponding private key of their public/private encryption key pair. Thus, each user can verify that the list was not manipulated during the number selection process, and accordingly, all users can be assured that the users selected and/or unselected according to a predetermined criteria related to the value of the numbers (e.g., the small number) was performed fairly.

The foregoing discussion of the invention has been presented for purposes of illustration and description. Further, the description is not intended to limit the invention to the form disclosed herein. Consequently, variations and modifications commensurate with the above teachings, and within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for restricting access to information communicated between parties, comprising the following steps performed by computational equipment:

first encoding of the information for obtaining a corresponding first encoded version of the information;

second encoding said first encoded version for obtaining a corresponding second encoded version of the information;

wherein one of said first and second steps of encoding results in said corresponding version being restricted from a first party decoding the information therein due to not having access to a first decoding data;

wherein another of said first and second steps of encoding results in said corresponding version being restricted from a second party decoding the information therein due to not having access to a second decoding data;

first providing, to the second party, said second encoded version;

subsequently, performing an activity upon receiving input from the first and second parties using one of: the information, or second information, for determining, according to a content thereof, a processing of the activity by the computational equipment, wherein the second information is operably different from the information for performing the processing;

after completing the activity, second providing to the second party said second decoding data;

wherein the second party then decodes the second encoded version using the second decoding data, and the first decoding data for obtaining the information; and wherein the information obtained from decoding by computational equipment is used to determine whether the activity was performed according to the information, or instead, according to the second information;

wherein said activity includes a game, wherein the information includes an ordered collection of game token values to be presented to the second party in accordance with one or more game rules.

2. The method as claimed in claim 1, wherein the first party is a provider of said activity, and the second party is a participant in said activity.

3. The method, as claimed in claim 2, wherein the step of first providing includes communicating between the first and second parties via a communications network.

4. The method, as claimed in claim 3, wherein said communications network includes one or more of: a local area network, a wide area network, the World Wide Web, and the Internet.

5. The method as claimed in claim 1, wherein said activity allows participants to enter the activity and obtain an entry identification, and wherein said activity associates one or more entry identifications with an outcome from said activity.

6. The method as claimed in claim 5, wherein said activity is one of: a contest, a lottery, a drawing, and a sweepstakes.

7. The method as claimed in claim 1, wherein at least one of said steps of first and second encoding includes encrypting the information using a key from a public/private encryption key pair.

8. The method as claimed in claim 1, wherein at least one of said steps of first and second encoding includes encrypting the information using a secret key.

9. The method as claimed in claim 1, further including a step of transmitting said first decoding data from the second party to the first party via a communications network.

10. The method, as claimed in claim 1, wherein said second decoding data is a decryption key.

11. The method, as claimed in claim 1, further including a step of comparing said instance of the information with said decoded version.

12. The method of claim 1, wherein one of said steps of first and second encoding uses one of an RSA encryption technique, a DES encryption technique, and a hashing technique.

13. The method of claim 1, further including a step of obtaining a decoder for performing one of said first and second decoding step from a trusted third party.

14. The method of claim 13, wherein said step of obtaining includes downloading said decoder from an Internet website.

\* \* \* \* \*